(12) United States Patent
Vale et al.

(10) Patent No.: US 11,986,719 B2
(45) Date of Patent: May 21, 2024

(54) INSTRUCTIONAL GOLF SIMULATOR SOFTWARE WITH PROFESSIONAL-TO-AMATEUR INTERACTIVE INTERFACE

(71) Applicants: Patricia M Vale, Guilford, CT (US); Timothy M Vale, Guilford, CT (US)

(72) Inventors: Patricia M Vale, Guilford, CT (US); Timothy M Vale, Guilford, CT (US)

( * ) Notice: Subject to any disclaimer, the term of this patent is extended or adjusted under 35 U.S.C. 154(b) by 573 days.

(21) Appl. No.: 17/077,838

(22) Filed: Oct. 22, 2020

(65) Prior Publication Data
US 2022/0126188 A1    Apr. 28, 2022

(51) Int. Cl.
| A63B 71/06 | (2006.01) |
| A63B 24/00 | (2006.01) |
| A63B 102/32 | (2015.01) |

(52) U.S. Cl.
CPC ...... A63B 71/0622 (2013.01); A63B 24/0006 (2013.01); A63B 71/0669 (2013.01); A63B 2024/0012 (2013.01); A63B 2071/063 (2013.01); A63B 2071/0638 (2013.01); A63B 2102/32 (2015.10); A63B 2220/05 (2013.01); A63B 2220/35 (2013.01); A63B 2220/805 (2013.01); A63B 2220/806 (2013.01); A63B 2220/89 (2013.01)

(58) Field of Classification Search
CPC ............ A63B 71/0669; A63B 24/0006; A63B 71/0622
See application file for complete search history.

(56) References Cited

U.S. PATENT DOCUMENTS

| 5,489,099 | A | 2/1996 | Rankin et al. |
| 5,938,545 | A | 8/1999 | Cooper et al. |
| 6,322,455 | B1 | 11/2001 | Howey |
| 6,520,864 | B1 | 2/2003 | Wilk |
| 8,512,162 | B2 | 8/2013 | Kim et al. |
| 2006/0252018 | A1* | 11/2006 | Sooch ............... A63B 69/3614 434/252 |

(Continued)

*Primary Examiner* — Kesha Frisby
(74) *Attorney, Agent, or Firm* — Barclay Damon LLP; Anthony P. Gangemi

(57) ABSTRACT

A software driven method for allowing amateur golfers to interact with a professional golfer utilizing inter alia, real life golf professional video footage, the method including a library of stored digitized video clips of a professional golfer hitting golf shots on a golf course while golf swing data of each shot is being taken by a launch monitor, video clips of the professional golfer discussing strategy for how his/her golf shot is or was attempted to be played, the professional golfer's golf swing data converted to a golf ball path that gets displayed against the backdrop of a virtual golf hole replicating the physical golf hole the golf shot was taken on, the software user's golf swing data, taken by a launch monitor and converted to a golf ball path displayed against the backdrop of the same virtual golf hole that the professional golfer's golf ball path is displayed on, and wherein the simulator software is configured to allow the user to play a simulated game of golf in tandem with the professional golfer and compare results to that of the professional golfer. The digitized archive of video clips includes clips taken from many years of professional golf play, allowing for clips from retired golfers or golf professionals.

19 Claims, 13 Drawing Sheets

(56) References Cited

U.S. PATENT DOCUMENTS

2014/0045624 A1* 2/2014 Forest .................... A63B 57/00
473/409
2017/0209764 A1 7/2017 Choi

* cited by examiner

| Hole | 1 | 2 | 3 | 4 | 5 | 6 | 7 | 8 | 9 | Total |
|---|---|---|---|---|---|---|---|---|---|---|
| Par | 4 | 3 | 5 | 4 | 4 | 5 | 3 | 4 | 4 | 36 |
| Score User 1 | 5 | 6 | 4 | 4 | 7 | 4 | 2 | | | |
| Score User 2 | 4 | 5 | 4 | 8 | 5 | 5 | 5 | | | |
| Score Pro 1 | 4 | 3 | 5 | 3 | 4 | 4 | 3 | | | |
| Total Strokes User 1 | 5 | 11 | 15 | 19 | 26 | 30 | 32 | | | |
| Total Strokes User 2 | 4 | 9 | 13 | 21 | 26 | 31 | 36 | | | |
| Total Strokes Pro 1 | 4 | 7 | 12 | 15 | 19 | 23 | 26 | | | |
| Match play Pro 1 | EVEN | UP 1 | EVEN | UP 1 | UP 2 | UP 2 | UP 1 | | | |

FIG. 13

INSTRUCTIONAL GOLF SIMULATOR SOFTWARE WITH PROFESSIONAL-TO-AMATEUR INTERACTIVE INTERFACE

TECHNICAL FIELD

The present invention relates to a system and method for giving amateur golfers an opportunity to play simulated golf alongside professional golfers, compare golf swing data to that of the professionals and to gain instruction from real life video footage of real life professional golfers. The invention provides a software interface which allows for golfers to improve their overall play through interactive consultation and scoring.

BACKGROUND

The use of golf simulators and golf simulator software has provided a means for amateur golfers to analyze and make improvements to their golf swings and mechanics. However, prior art simulators and software do not do enough to improve a golfer's ability to lower their golf scores (during play) and thus become a more skilled golfer. In-person tutoring and play with a golf professional or professional instructor has proven to be the most effective way to lower a golfer's score. A golfer given an opportunity to play alongside and learn from a better and much more experienced golfer will be able to learn in ways not possible by other means such as reading books or watching videos. Learning golf strategy is best done while playing a round of golf where many different scenarios are faced and dealt with in real time.

However, at issue with learning from a golf professional or professional instructor is that most amateur golfer do not have access to high-level professional instructors or golf professionals. What is required is a means for giving more amateur golfers an opportunity to play a round of golf with professionals. By playing with a professional, utilizing video and ball flight data, users will have more fun, while at the same time facing "on course" situations that the professional golfer faces, as well as understanding how and what the pro thinks. There are too many amateur golfers and too few professional golfers for these golfers to participate in a round of golf together at the same time. Additionally, this type of on course instruction would be cost prohibitive as the professional golfer's time is very valuable and very limited.

There is no software available that allows a professional golfer to communicate with a user in the form of video clips taken on the real life golf course at the same time the user is playing that same golf course virtually using a golf simulator. There is no software available that displays either raw data or else a three dimensional trace of the path that the golf ball travels against the backdrop of a simulated golf hole which is the same golf hole from the video clip. There is no software providing the means for the user to compare their golf shots to those of the professional. Furthermore, there is no software providing the means for the user to compete against the professional golfer while receiving information from the professional regarding golf strategy, aiming points and optimum golf shot distance and trajectory.

Existing golf simulation software has the ability to enable a golfer to play a round of golf in a completely simulated environment on any number of golf courses made available to a user from a large database of real world or imaginary golf courses. While simulated, there is no software available that allows a professional golfer or high-level golf instructor to communicate with a user interactively. As the simulation does not allow direct communication, most golf simulation programs provide entertainment to users, but do not result in improvement in the play of the amateur golfer.

What is needed in the industry is a means for amateur golfers to improve their game through the use of a golf simulator program that incorporates the real life video footage of golf professionals. This is achieved through the creation of golf professional and/or high level golf instructor video clips that interact with the amateur golfer during at least one simulated round of golf.

SUMMARY OF THE INVENTION

The instant invention provides a software driven method for allowing amateur golfers to interact with a professional golfer utilizing inter alia, real life golf professional video footage, the method including a library of stored digitized video clips of a professional golfer hitting golf shots on a golf course while golf swing data of each shot is being taken by a launch monitor, video clips of the professional golfer discussing strategy for how his/her golf shot is or was attempted to be played, the professional golfer's golf swing data converted to a golf ball path that gets displayed against the backdrop of a virtual golf hole replicating the physical golf hole the golf shot was taken on, the software user's golf swing data, taken by a launch monitor and converted to a golf ball path displayed against the backdrop of the same virtual golf hole that the professional golfer's golf ball path is displayed on, and wherein the simulator software is configured to allow the user to play a simulated game of golf in tandem with the professional golfer and compare results to that of the professional golfer. The digitized archive of video clips includes clips taken from many years of professional golf play, allowing for clips from retired golfers or golf professionals.

The present invention works through the creation of live video footage and golf swing data of a professional playing golf on particular golf course. Alternatively, in the event a desired professional playing golf is no longer living, previous video of the deceased professional golfer can be used to provide necessary swing data (to be used by the present system and method). In such an instance, golf swing data is generated after the professional golfer's round of golf using known information about the ball flight, shot distance, golf club used, and feedback from the professional golfer (or an analyst if the professional golfer is not available).

It is also important to note that there is an entertainment value in the present invention, and in some cases a fulfillment of a lifelong dream, for a golfer to be able to play a round of golf alongside their favorite professional golfers.

BRIEF DESCRIPTION OF THE DRAWINGS

FIG. 13 illustrates the scorecard of the prior invention where performance of the user playing the simulated golf course is displayed against the performance of the professional golfer.

It will be readily understood that the components of the embodiments as generally described and illustrated in the FIGS. herein, may be arranged and designed in a wide variety of different configurations in addition to the described example embodiments. Thus, the following more detailed description of the example embodiments, as represented in the FIGS., is not intended to limit the scope of the embodiments, as claimed, but is merely representative of example embodiments. Furthermore, the described features, structures, or characteristics may be combined in any suitable manner in one or more embodiments.

As used herein the term "golf course" shall refer to a plot of land populated and sectioned off by scoring holes, hazards, such as sand plots and bodies of water, different heights of turf or grass, such as low grass, known as greens and fairways, and higher grass portions known as rough, wherein a user must successfully navigate the plot in order to place a third object, such as a ball, in the scoring holes;

As used herein, "professional" refers to an individual or system that is recognized for their ability to provide high-level advice to a user while navigating a golf course, in order to decrease the number of hits required to position the third object into a scoring hole;

As used herein, "real life video footage" refers to a captured analog or digital visual representation of a person, which for the instant invention is a visual representation of a professional.

As used herein, "real life audio" refers to captured audio of a person, which for the instant invention may be audio only or else audio captured within "real life video footage"

DETAILED DESCRIPTION OF THE INVENTION

Figure 1:
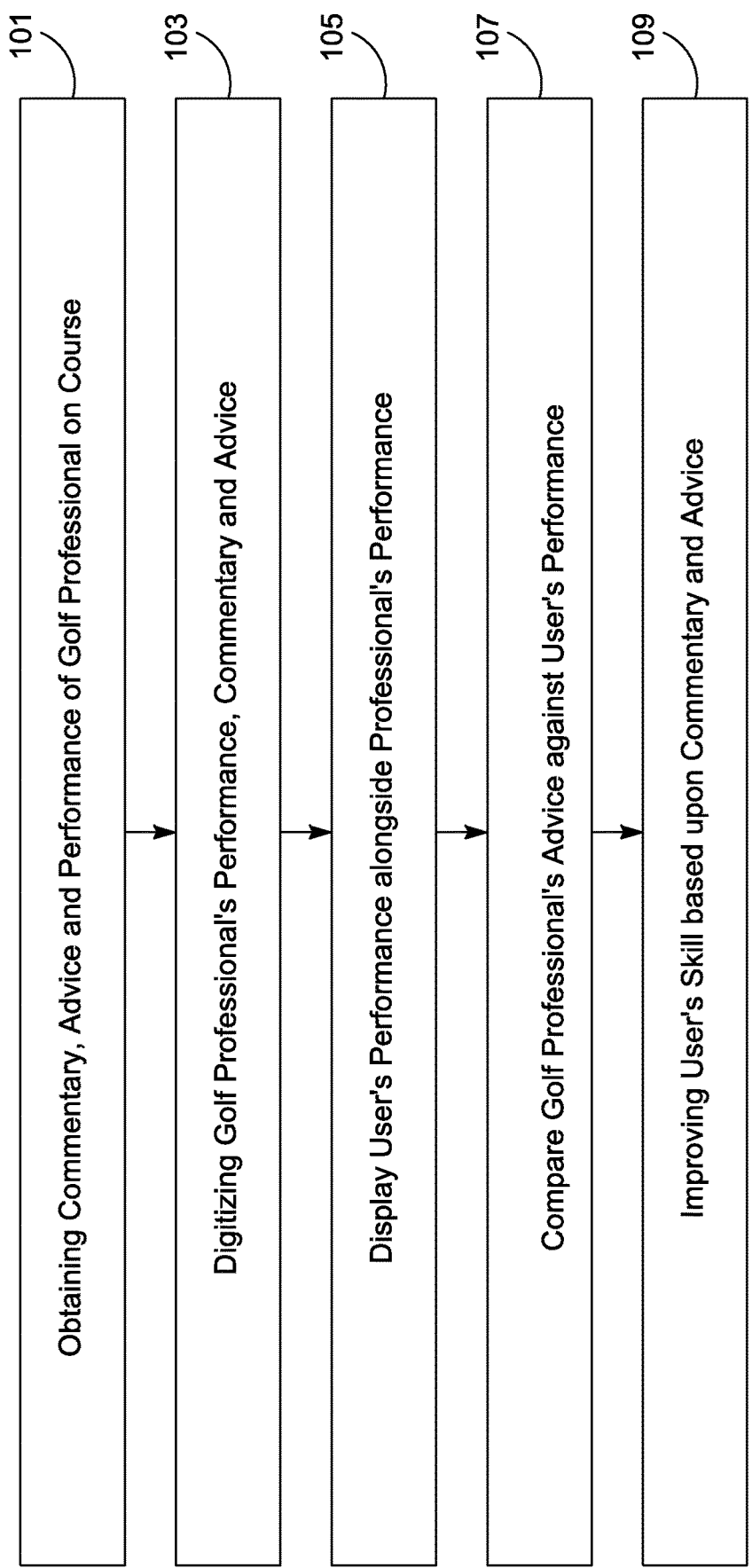
FIG. 1 illustrates an embodiment of method of the present invention.

FIG. 1 is an embodiment of the method of the present invention, whereby during a professional's play on a chosen golf course, the professional's performance during the round of golf (i.e., "play"), is recorded 101 as video and other data. Specifically, the recorded performance includes the professional's commentary on particular strokes on a hole, advice the professional can provide for a particular hole, advice the professional can provide for a particular stroke on a particular hole, the professionals score for a particular hole, the professionals scoring for a particular stroke, and data relating to the professional's swing. Data relating to the golf professionals swing can include, in addition to video images, swing speed, swing path, golf club angle of attack, club face angle, golf ball launch angle, golf ball speed, golf ball spin, golf ball trajectory, golf ball carry distance, golf ball total distance and smash factor. As will be discussed below, the professional's performance will be recorded by any of several different instruments, such as digital video recorders, digital audio recorders, radar guns, launch monitors, infrared devices. In one embodiment, an instrument may include several different types of measurements such as radar and high speed cameras capabilities. In a still further embodiment, camera crews can record commentary about the golf course, golf hole, golf shot, and the like, which is saved as a video data file.

Following the recording of the professional's performance as described above, the recording is digitized and stored on media 103. The recording will include data related to swing speed, swing path, golf club angle of attack, club face angle, golf ball launch angle, golf ball speed, golf ball spin, golf ball trajectory, golf ball carry distance, golf ball total distance and smash factor, as well as the video data of the actual swing by the professional. In one embodiment, the digitized recording is stored on local media on the recording devices, for example a hard drive on the digital video recorder. In another embodiment, the recording is uploaded in real-time to a remote server on a wide area network (such as the Internet). In this embodiment, the recording device is connected wirelessly to the wide area network. In a further embodiment, the recording is an analog recording. In such an embodiment, the analog recording will, following the original recording, be transformed to a digital version, which will then be stored. The storing of the digitized professional's performance will allow the performance to be sliced into desired segments, such as the audio portion, the visual portion, and the analyzed play portion. By being able to be sliced into various segments, the individual segments can then be called upon based upon an amateur's performance during use of the system. For example, if the amateur performs a "good" stroke, the system can call upon the segment that provides positive feedback to the amateur on her performance, this segment being in the form of, e.g., a recorded analysis by the playing professional of the good stroke. If the amateur performs a "poor" stroke immediately following the "good" stroke, the system can call upon that segment that provides instruction to the amateur to improve that particular stroke. For example, if the amateur hits a "slice" because of a "loose elbow", the segment may include a comment from the professional regarding the bad swing or show a video drill for correcting the swing flaw. Segmentation thus allows more dimensions of the professional's performance to be utilized as opposed to just the professional's straight play through a hole.

After the professional's performance is stored digitally, the analysis of the professional's performance is now capable of being used by the system for comparison purposes. The analysis of the professional's performance results in a line function f(x) ("professional line f(x)"). During a user's interaction with the system, a user plays a digital recorded (simulated) version of a chosen golf course which was played by a particular professional. The user's performance on a stroke for a particular hole results in a line function, i.e., "g(x)" ("user's line g(x)"). As will be discussed later, the system visualizes the professional's line f(x) and the user's line g(x), to show ball flight.

Additionally, the audio segment of the professional's performance, notably an "advice" sub-segment, is associated with a particular stroke on a hole. The advice sub-segment determines the preferred performance (i.e., desired type of shot, angle of approach, etc.) for playing a stroke for a particular hole. The advice sub-segment provides the professional's advice for "best" landing position and ball path. "Best" landing position can be defined as the most suitable resting position for a ball after strike, which will more than likely lead to a user attempting to land the ball in the "best" position after the next strike. The comparison of the professional's advice against the user's performance 107 determines the type of feedback given to the user.

The feedback given back to the user 109 is performed to either 1) improve the user's performance on a stroke on a particular hole, 2) provide positive feedback to encourage them to continue performing well, 3) provide mid-level feedback on more nuanced suggestions or 4) provide funny commentary aimed at teasing the user, this being a way to simulate the casual banter common when playing with a teaching professional.

Figure 2:
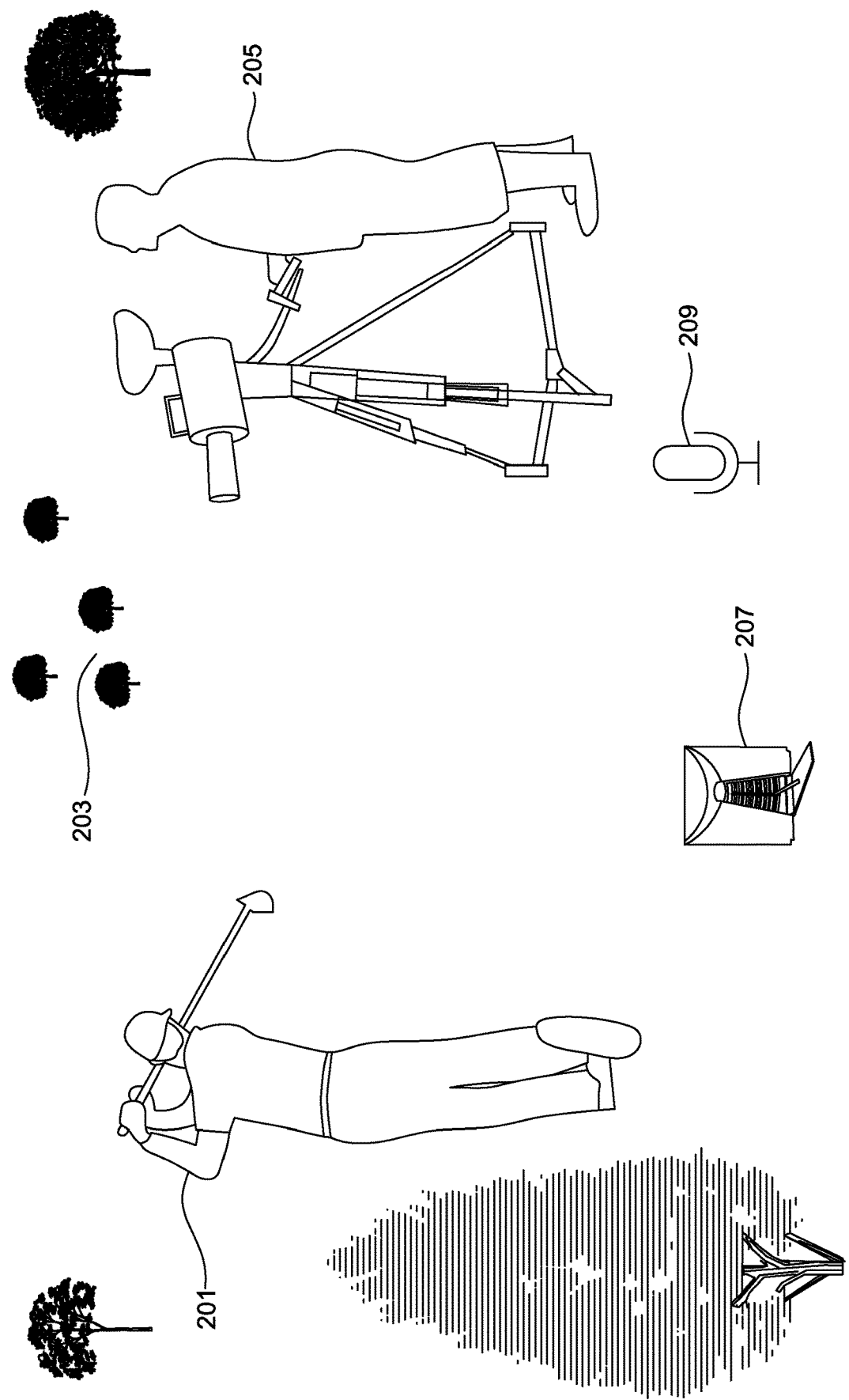
FIG. 2 illustrates an embodiment of the present invention, whereby the performance of professional is recorded.

FIG. 2 is an embodiment of the recording of the professional's performance during a round of golf. A particular professional, which can include a golf professional or high-level golf instructor, is selected to play a round of golf on a chosen golf course. "Professional" as used herein can generally be defined as an individual who is or has been, in a full-time sense, monetarily compensated for their play of golf or for the teaching of golf. For example, the player Vijay Singh, who has won 34 events on the PGA tour, may be considered a professional. Just as equal, Josh Zander is a PGA Teaching Professional from California who does not play competitive golf, but is recognized as one of 100 best teachers in America. A key benefit of the present system is its ability to act as a historical marker for the performance of professional golfers. Such benefit allows professional golfers, who will eventually stop playing, to still have their performance available for future users of the system. The chosen golf course relates to a specific golf course that may be of high-interest to a large number of amateur golfers in terms of their opportunity to play. For example, Augusta National Golf Club, Old Course at St Andrews, or Turnberry Golf Course. Chosen golf courses can be located in any country, including the United States, the United Kingdom, or Japan.

Recording the professional's performance consists of recording his visual performance, generally by camera, including digital camera 205. Visual capture by camera can record in a variety of wavelengths along the electromagnetic spectrum. For example, visual capture can occur in the visual range (400 to 700 nm). Visual capture can also occur in the infrared range to capture the professional non-visible body change, such as temperature changes.

Recording the professional's performance also consists of recording his swing performance, usually occurring between the period of "addressing" or standing before the ball prior to striking, and the period after the ball is hit. The recording can be by launch monitors, radar-based devices, camera-based devised, or combination-based devices 207. Through the device 207, data, as set forth above can be obtained, the scope of the data in accordance with the particular device and recording method used. For example, a launch monitor will generate data related to ball speed, spin rate, and trajectory. The data can be stored locally, in a storage medium within the device, or be delivered via wide area network to a remote storage.

The professional's audio commentary will also be collected 209. Collecting the audio commentary can consist of recording the professional's recommendations for the "best" position for where a ball should land, and the preferred path of the ball as it travels to the "best" position. The professional's audio and video can be collected in real-time, as he is playing the round of golf on the chosen golf course. In another embodiment, the professional's audio can be recorded after the round of golf. In this embodiment, the professional can view his performance from the recorded visual capture, and provide commentary while viewing the visual capture. The audio and video can be captured locally on a storage medium within the device, or delivered via wide area network to a remote storage. In the case where audio or video is unavailable (e.g., a deceased golfer), audio commentary may be provided by someone other than the professional.

Through the instant invention, users may also be able to play historic rounds of golf with professionals who played that historic round. For example, a user will be able to play with Jack Nicklaus during his historical final round at the 1986 Masters Tournament. To allow users to play such a round, the professional's performance will be taken from the previously recorded performance. The system and method of this invention will extract the necessary data from the professional's performance and add the data to the database of the system. For example, archived analog video may be used to generate actual digital data on ball flight based on prevailing conditions and actual ball flight and carry distance.

In another embodiment of the present invention, the professional may play a simulated golf course and have his performance recorded there. In such an embodiment, the professional plays a digital (simulated) golf course in an indoor facility, and his performance, like that performed for a real golf course, is recorded.

Figure 3:
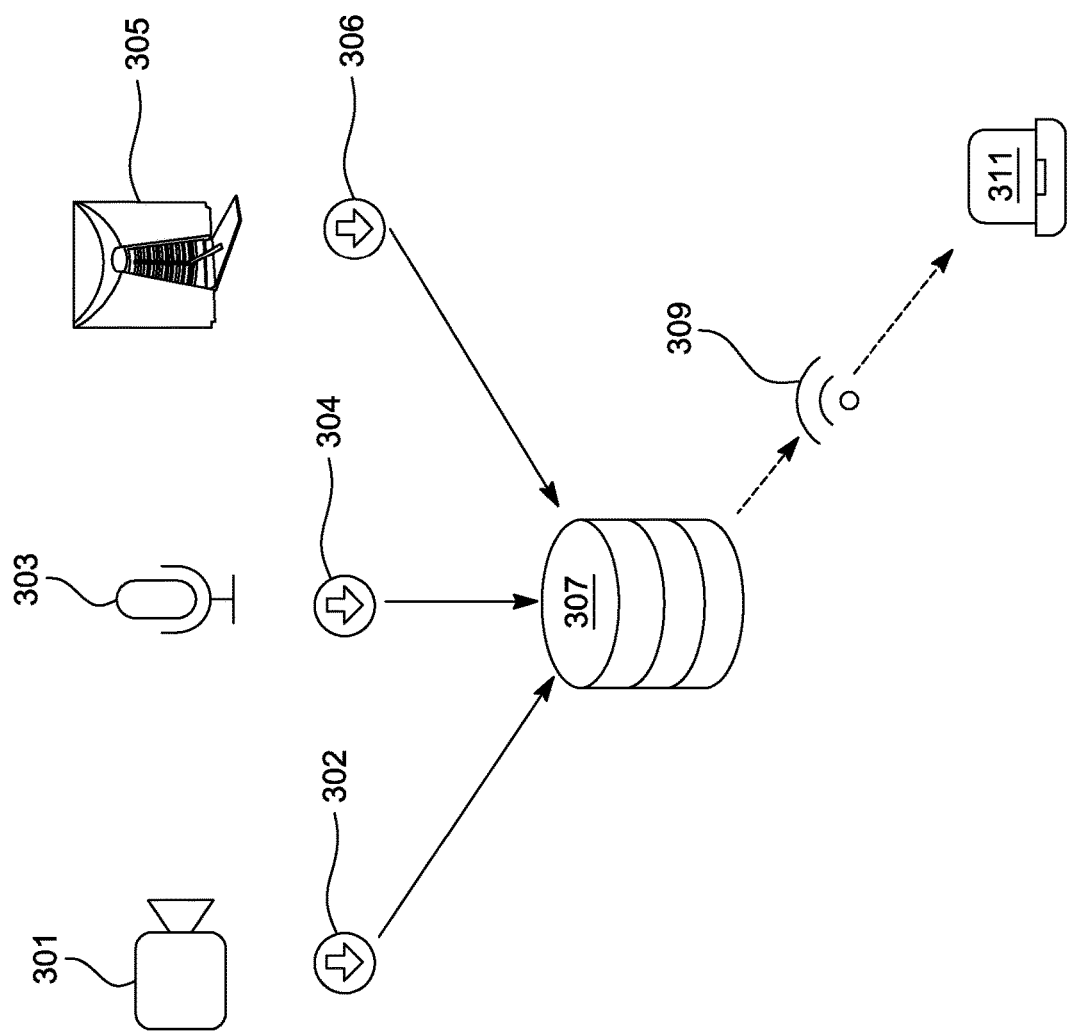
FIG. 3 illustrates an embodiment of the present invention, whereby the professional's performance is recorded.

FIG. 3 is an embodiment of the present invention, whereby means for capturing the professional's performance, including visual capture 301, audio capture 303, and swing performance 305, can be stored on a server 307. The performance, which can digitized or analog, can be sent 302/304/306 to a local server or to a remote server. In the event the performance is stored locally, it can be uploaded to a remote server. Storage on the remote server allows the digitized performance to be utilized in improving the performance of the user, when the user engages the simulated software.

Utilization of the digitized performance can be accomplished by a server 311 in remote communication with the server 307 over a wide area network 309. In one embodiment, the simulator system is located at a remote distance from the server 307. When a user selects a chosen golf course and a professional who has recorded a performance on that golf course, a local server 311 (which is in near proximity to the user) can access the recorded performance from the remote server 307. In another embodiment, a local server 311 can regularly download professional performances on a time basis, for example, once a year, twice a year, or monthly.

Figure 4:
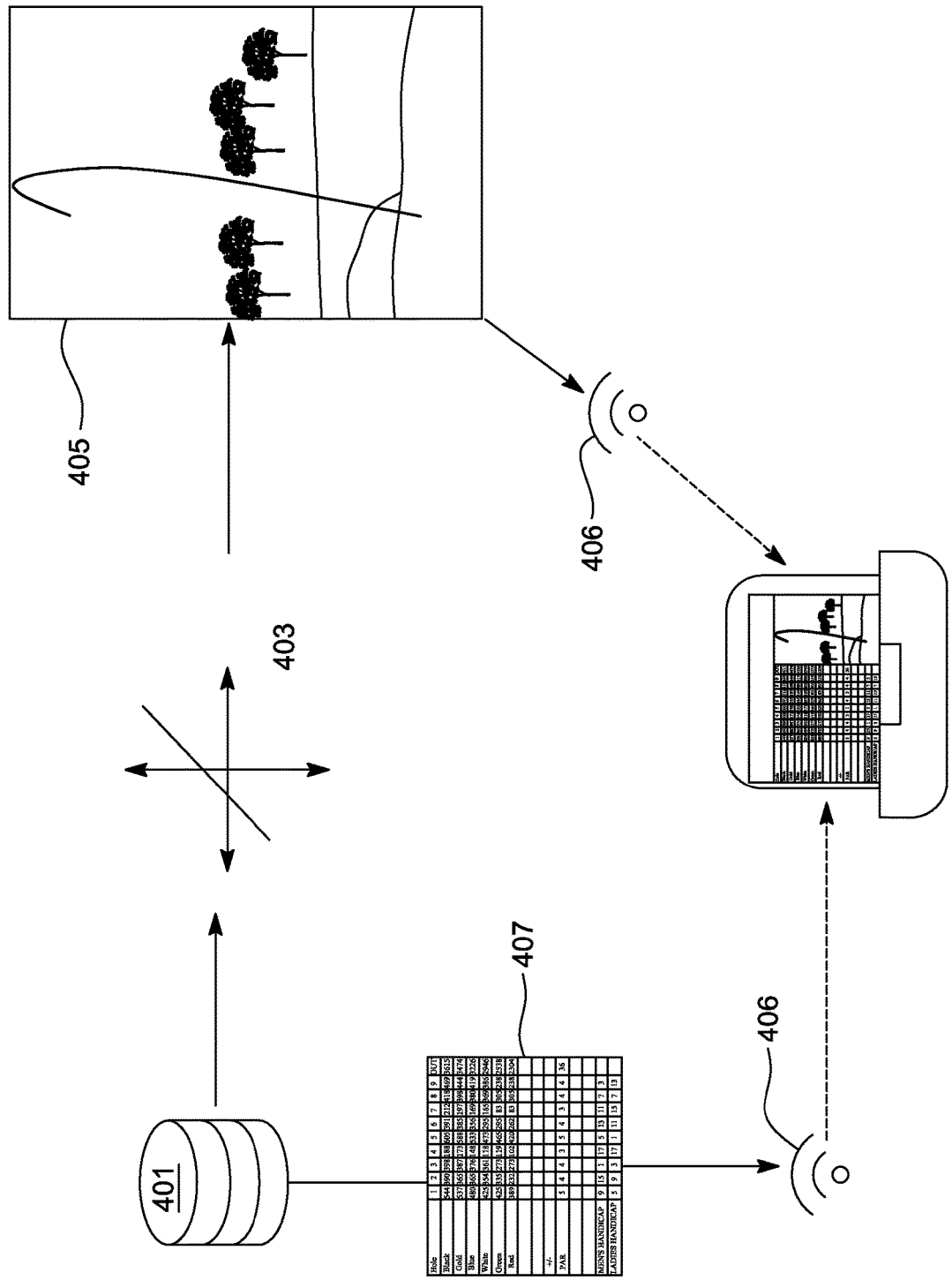
FIG. 4 illustrates an embodiment of the present invention where the golf ball path of the professional is calculated.

FIG. 4 is an embodiment of the invention, whereby following storage of a professional's digital performance on a remote server 401, a function f(x) 403 for strokes performed by a professional on a particular hole can be calculated and graphic visualizations can be realized 405. The professional's digital performance is also used to generate scoring per hole for the round of golf 407. Both the visualized stroke graphic 405 and the generated scoring 407 can be accessed by a locally-based server 409 via remote means 406. As will be discussed later, the visualized stroke graphic 405 and the generated scoring 407 will be utilized for comparison against the user during simulated competition play.

Through the present system, the simulated software which allows users to engage with the recorded video performance of the professionals is loaded onto a computer housed inside of any type of traditional golf simulator bays, rooms or building/structure. Each bay, room or building/structure is comprised of a traditional radar or camera based launch monitor that communicates with the simulator software; a grass or artificial grass hitting surface; a screen that the ball is hit towards or into; a screen or monitor to display the golf shots; and a computer display with keyboard/mouse or else a touchscreen monitor for the user to interface with the software. The equipment and facility mentioned above already exists as it is required to play most types of simulated golf and is therefore not new to this patent.

To use the present system via the simulator software, the user will choose which professional golfer he/she wants to play with and which golf course to play. Note: the software will have the ability to play with more than one professional golfer at a time. The software user will also enter his/her user name along with user names of any others that will be playing the game. Total number of users plus professional golfers will generally be kept to 4 or less to limit the length of time it takes to play the game. Although, the software can allow for more than 4 players to play at once.

The present system and method allow multiple means for a user playing against or with the professional video recordings and data, including competing against the professional whereby the user plays his/her own ball, in stroke play and the player with fewest number of shots wins. Another means of user play is competing against the professional whereby the user plays his/her own ball in match play and the player with fewest number of shots on the most holes wins. Still another means of user play is the user playing alongside the professional as members of the same team whereby shots from each of the players can combine or else best shot from each player is used to form a team score. Yet another means of user play is the user competing against the professional in a points based game, whereby points are assigned to landing areas based on the professional's guidance. In this means of play, the professional and user hit from the same locations on the digital golf course.

As a still further embodiment, for the first and second means of play, the user may choose to hit select shots from the same location on the digital golf course as the professional (mainly the $2^{nd}$ shot) while playing his/her own ball for other shots.

During the user's play, the professional golfer's golf swing data is displayed alongside the user's golf swing data, including swing speed, swing path, golf club angle of attack, club face angle, golf ball launch angle, golf ball speed, golf ball spin, golf ball trajectory, golf ball carry distance, golf ball total distance and smash factor. Following completion of a golf round, the professional golfer's stats are displayed alongside the user's stats, including drive distances, fairways hit, greens hit in regulation, average number of putts and total distance of putts made.

Figure 5:
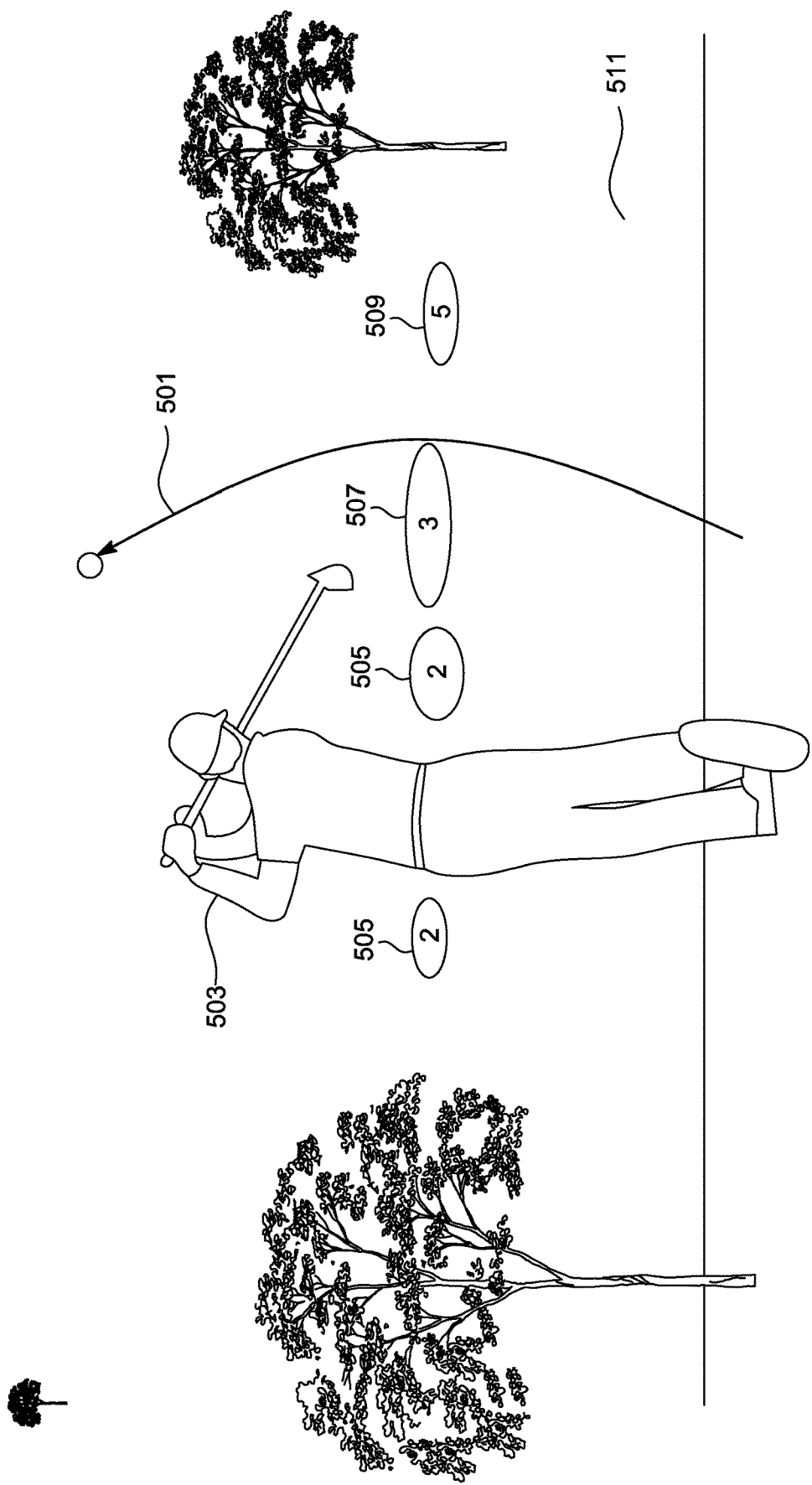
FIG. 5 is a further embodiment, illustrating how a professional's performance can be scored based on actual landing position of the golf ball.

FIG. 5 is another embodiment of the present invention, where, following the professional's stroke 503, the ball landing position is determined and scored (505/507/509), and the ball flight 501 is recorded. Through the recording of the ball landing position (505/507/509) and the ball flight 501, the professional is able to show his real-world performance, and record audio and video on the "best" ball landing. The "best" ball landing will make up the standard from which the user's simulated performance will be measured. The professional's stroke will be recorded on a chosen golf course 511. The professional may elect to be recorded playing more than one shot from select locations on the golf course (also known as playing an additional ball) to give opportunity to describe a larger variety of circumstances on the golf course and also for the software to later choose varying combinations of balls played resulting in variable performance of the professional golfer for the user to play alongside and compete against.

Figure 6:
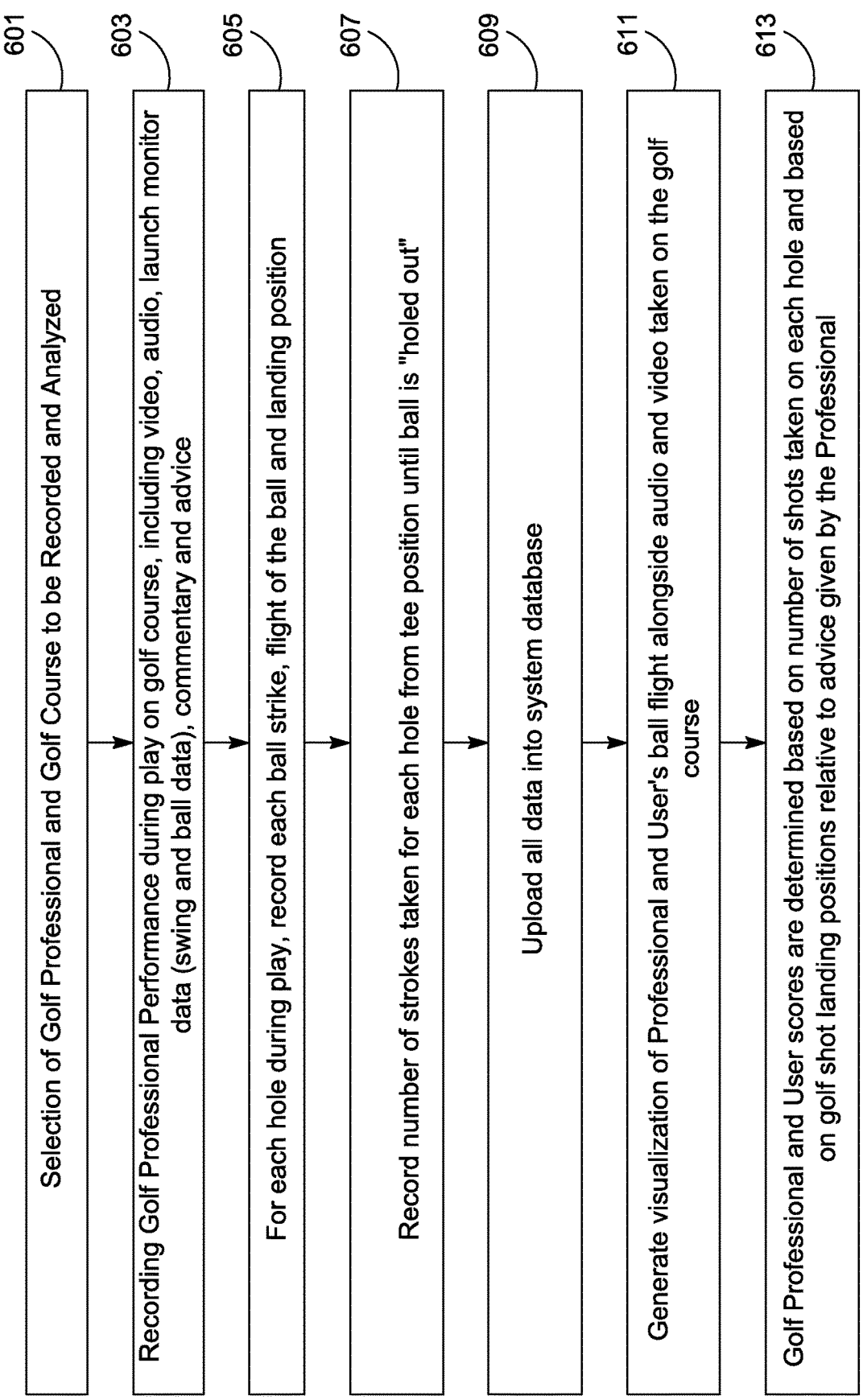
FIG. 6 is a further embodiment, depicting how the user interacts with the system.

FIG. 6 is an embodiment of the method of the present invention, whereby the performance of the professional is recorded. Firstly, a professional is selected, followed by a chosen golf course the professional will play a round of golf on 601. The professional selected may be selected based upon her proximity to the chosen golf course.

The recording of the professional is then performed 603, in the manner as indicated above. For each stroke during the play of a particular hole, the flight of the ball and landing position of the ball will be captured 605. During each stroke, as set forth above, further data is captured by the launch monitor, including swing speed, swing path, golf club angle of attack, club face angle, golf ball launch angle, golf ball speed, golf ball spin, golf ball trajectory, golf ball carry distance, golf ball total distance and smash factor.

Recording will also occur for the number of strokes taken for a particular hole, from the tee to the hole 607.

All recordings and data will then be uploaded on a storage medium, for example a remote storage or local storage 609. Following uploading and analyzing the recordings and data, graphic visualization of the professional's ball flight for a particular stroke is generated 611. Scoring for the professional for each hole will be generated 613.

Figure 7:
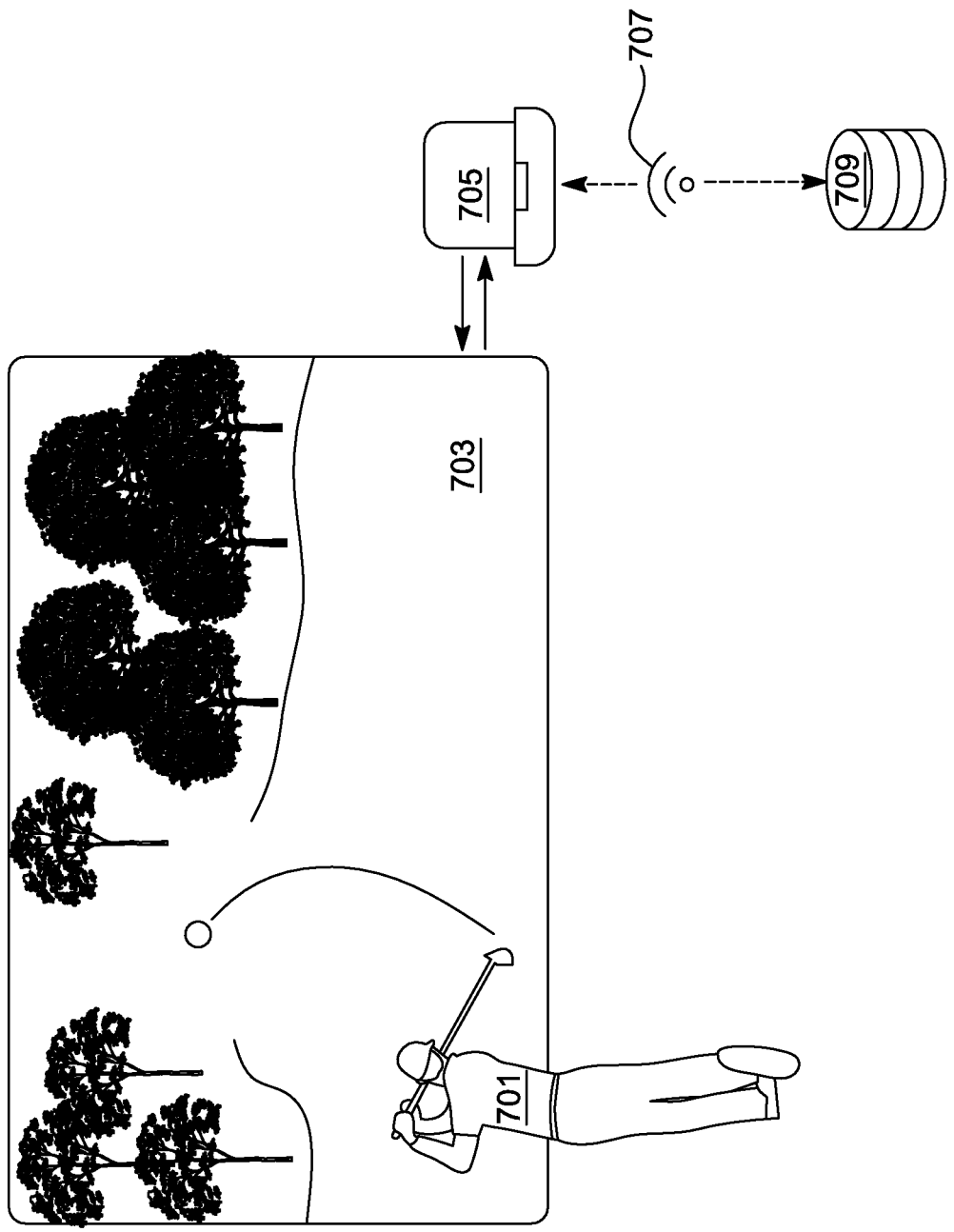
FIG. 7 is a further embodiment of the instant invention, depicting how the user interacts with the simulated golf course.

FIG. 7 is an embodiment of the user engaging with the golf simulator of the present invention. In use, the user 701, while standing before a graphic visualization of a chosen golf course 703, the user strikes a ball towards the visualization. The strike of the ball will be commensurate with a stroke on a particular hole. The local server 705 will be used to deliver the visualized chosen golf course 703, the digitized performance of the professional, and record the user's performance. The users 701 performance will be recorded locally. The local server 705 will be in remote communication 707 with the remote server 709.

Figure 8:
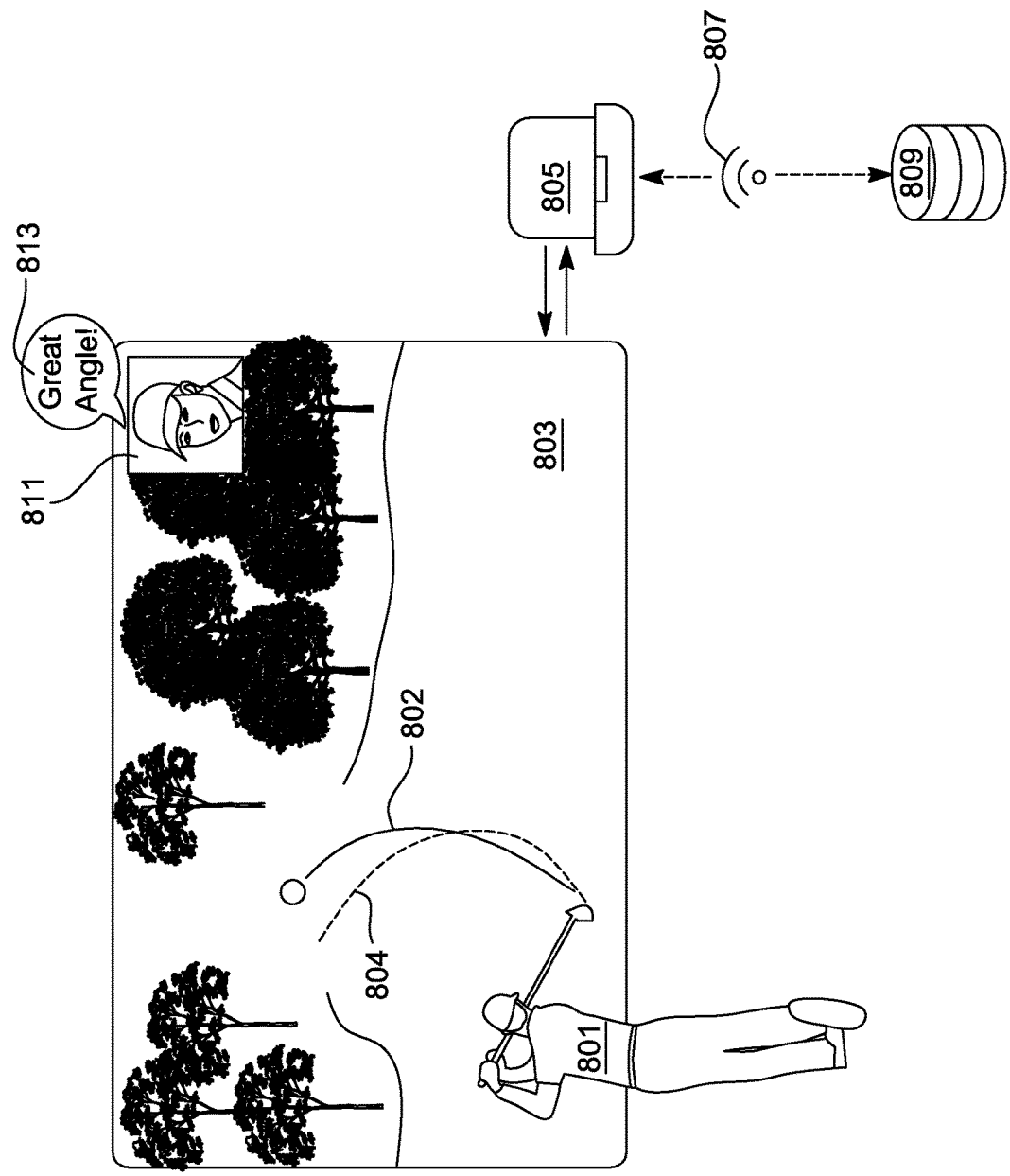
FIG. 8 is embodiment of the instant invention, illustrating the user's performance compared against the professional's

FIG. 8 is an embodiment of the present invention, wherein the professional's performance line f(x) 802 for a particular stroke on a hole is shown graphically alongside the user's performance line g(x) 804. As shown, following the selection of a professional golfer 811 and a chosen golf course 803, the local server 805 delivers a visualization of the golf course, the professional's performance, including the line f(x) and data, and the professional's audio and video segment 813. The information delivered from the local server 805 can be obtained from a remote server 809 via wide area network 807. The information can be obtained prior to the user's 801 simulated round of golf, or can be delivered in real-time.

As will be discussed later, the professional's audio segment 813 firstly provides advice to the user for landing the "best" ball. After the landing of the user's ball, the audio segment 813 provides commentary on the user's performance for that stroke.

In the embodiment of FIG. 8, the user's landing was nearby the "best" landing, and therefore received positive feedback from the audio segment. The audio segments 813 may be audio accompanied by video.

Figure 9:
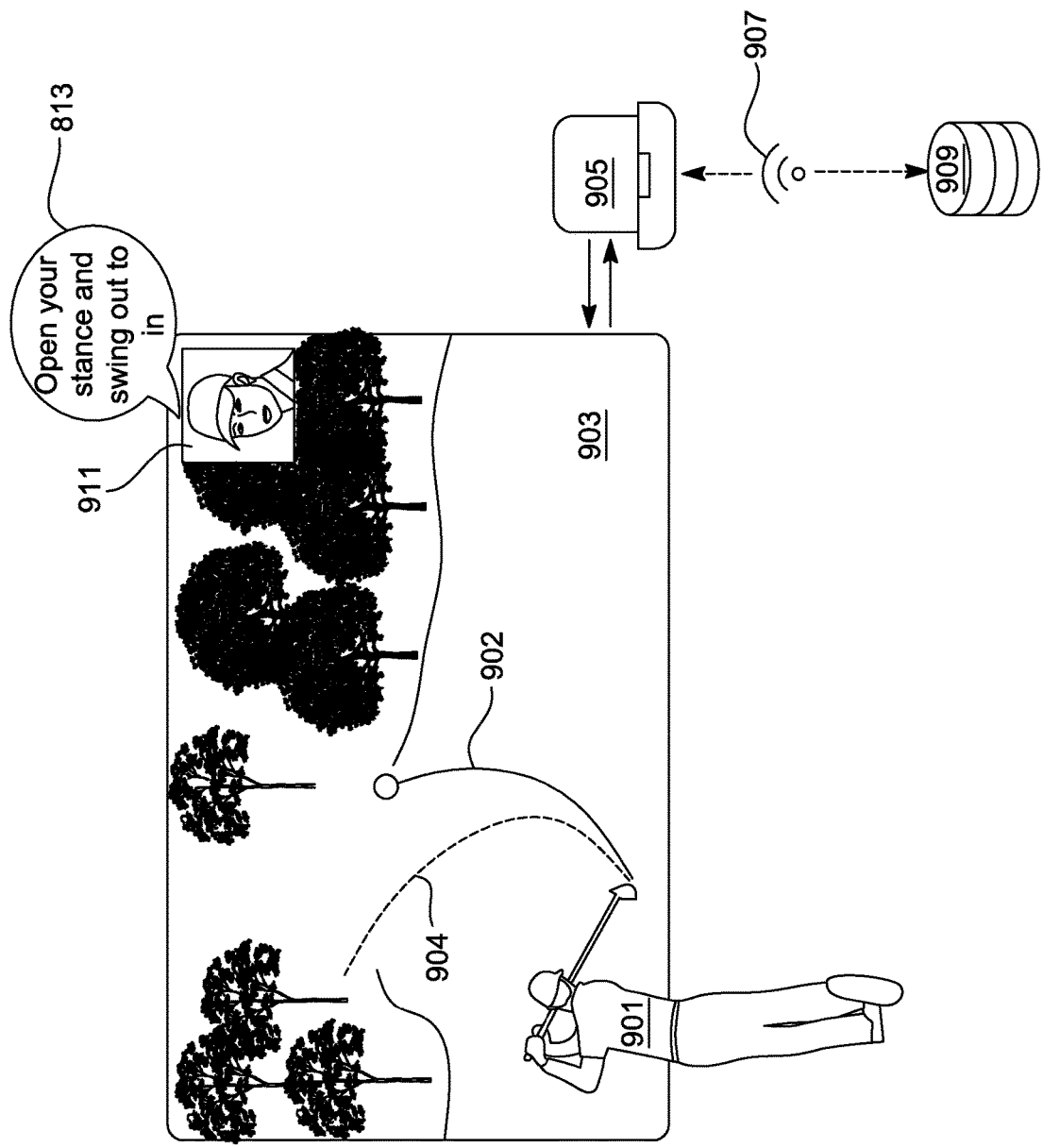
FIG. 9 is a another illustration showing the user's performance as compared against the professional's performance.

FIG. 9 is an embodiment of the present invention, whereby the user's performance, based upon the landing of the ball 902, is deemed significantly less than the "best"

landing. In such an embodiment, the audio segment will provide an assessment of the user's performance and recommend enhancements.

Figure 10:
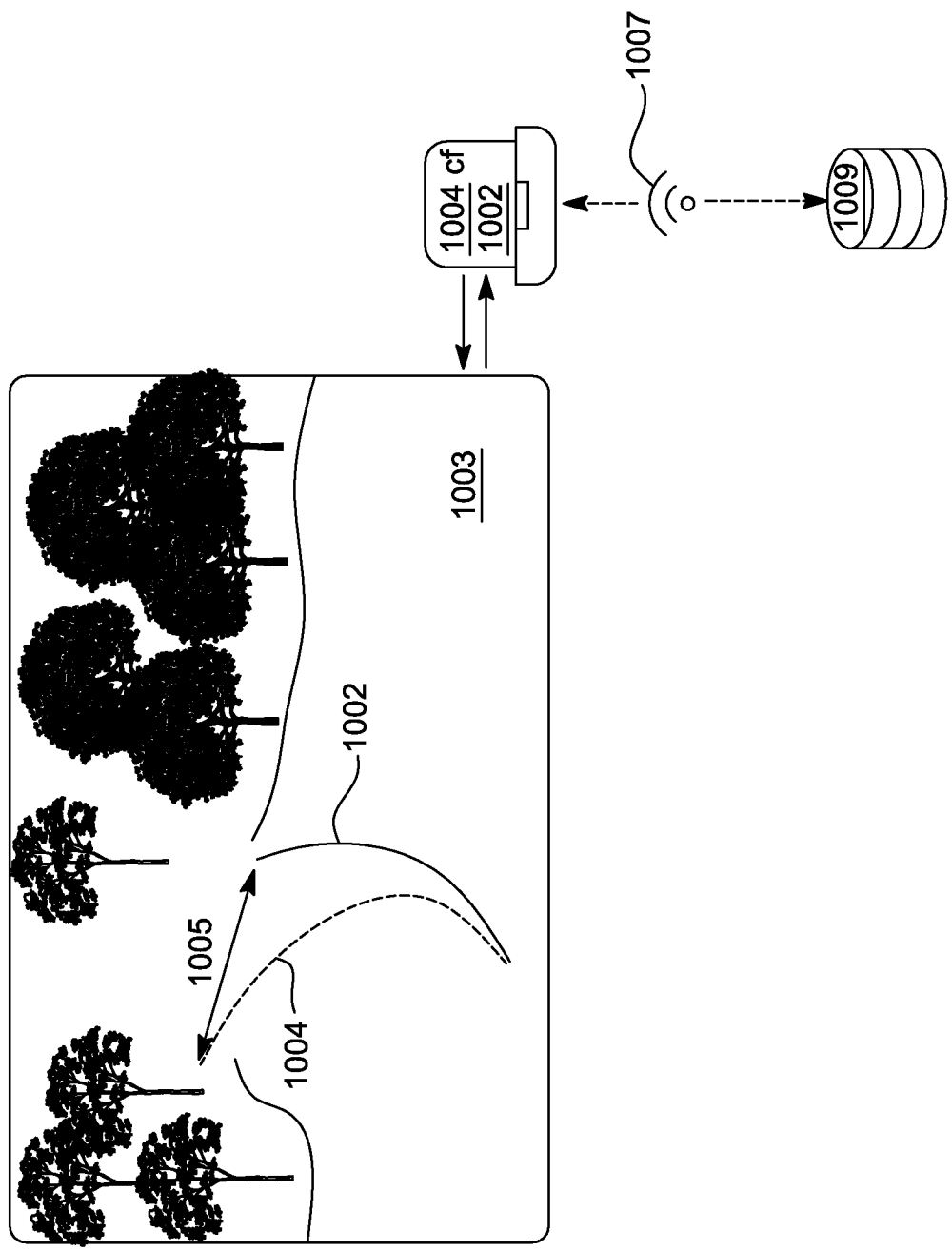
FIG. 10 is a further illustration of the instant invention, comparing the user's actual landing position of the golf ball relative to the professional's landing position.

FIG. 10 is an embodiment of the present invention, whereby a determination on the type of assessment given (positive re-enforcement, minor re-enforcement, or significant recommendation to a user's play), is based upon the difference between the landing of the user's ball 1002, the ball flight path (i.e. the shape of the shot), and the "best" ball landing 1004, as recommended by the professional. The difference will be determined using data generated by the user's actual ball flight, compared with the optimal shot data generated by the professional.

Figure 11:
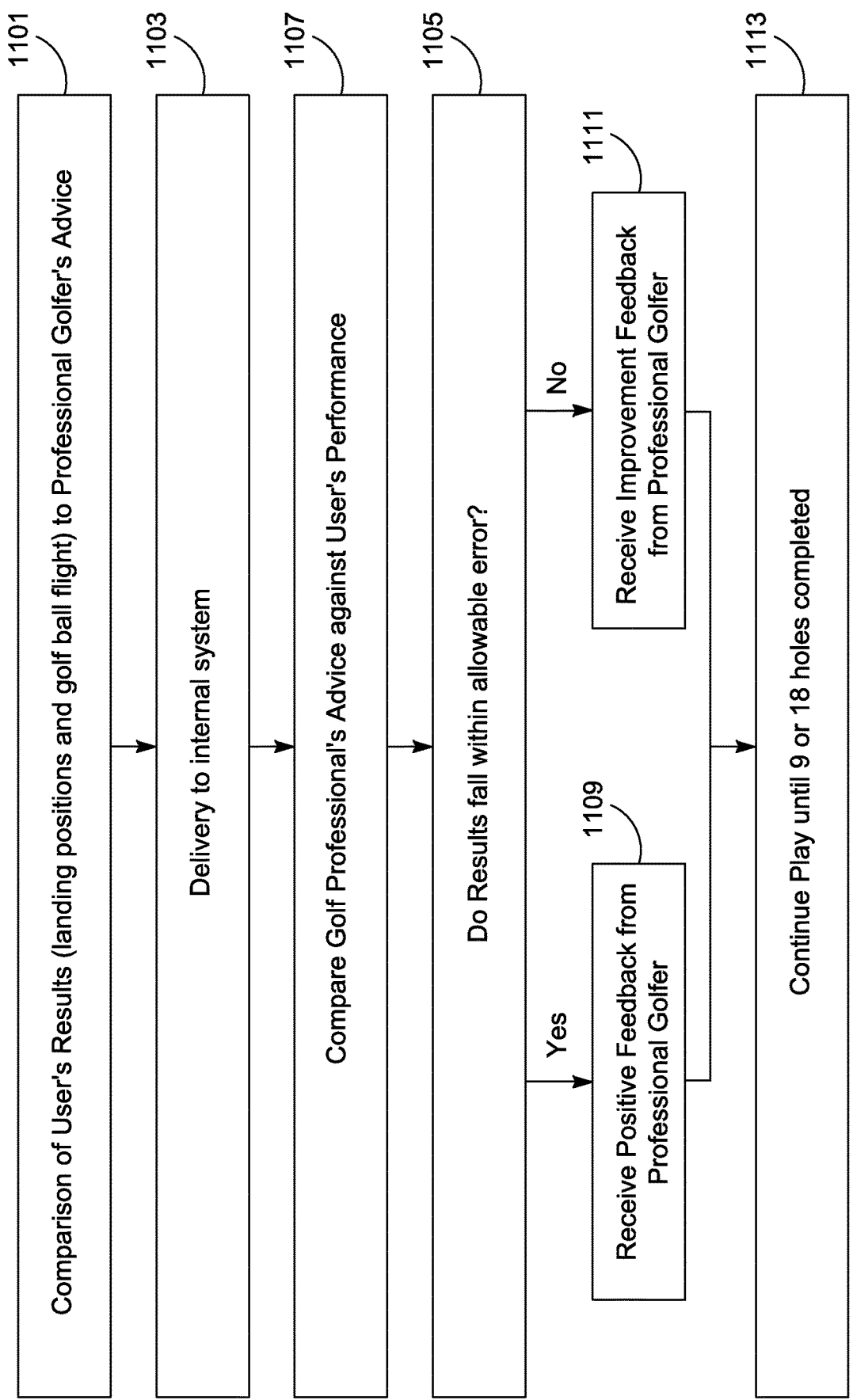
FIG. 11 illustrates the inventive method of receiving feedback.

FIG. 11 is an embodiment of the present invention, whereby the method for determining the level of feedback from the audio segment is provided. The method involves comparing the user's performance following stroke on a ball with the advice on the "best" ball provided by the professional's audio segment. The performance is based upon the variables of the landing position of the ball and the flight of the ball 1101, as determined by the user's performance data. The user's performance data is delivered to the local server 1103. In another embodiment, the data is delivered to a remote server. In comparison to the "best" ball landing, a determination is made whether the user's ball lands within an allowable error 1105. In the event the user's ball lands within the allowable error 1106, the user receives positive feedback from the audio segment. In the event the user's ball lands outside the allowable error 1108, the user receives recommendations for improvement from the audio segment.

The user is then directed to complete the simulated round of golf 1109.

Figure 12:
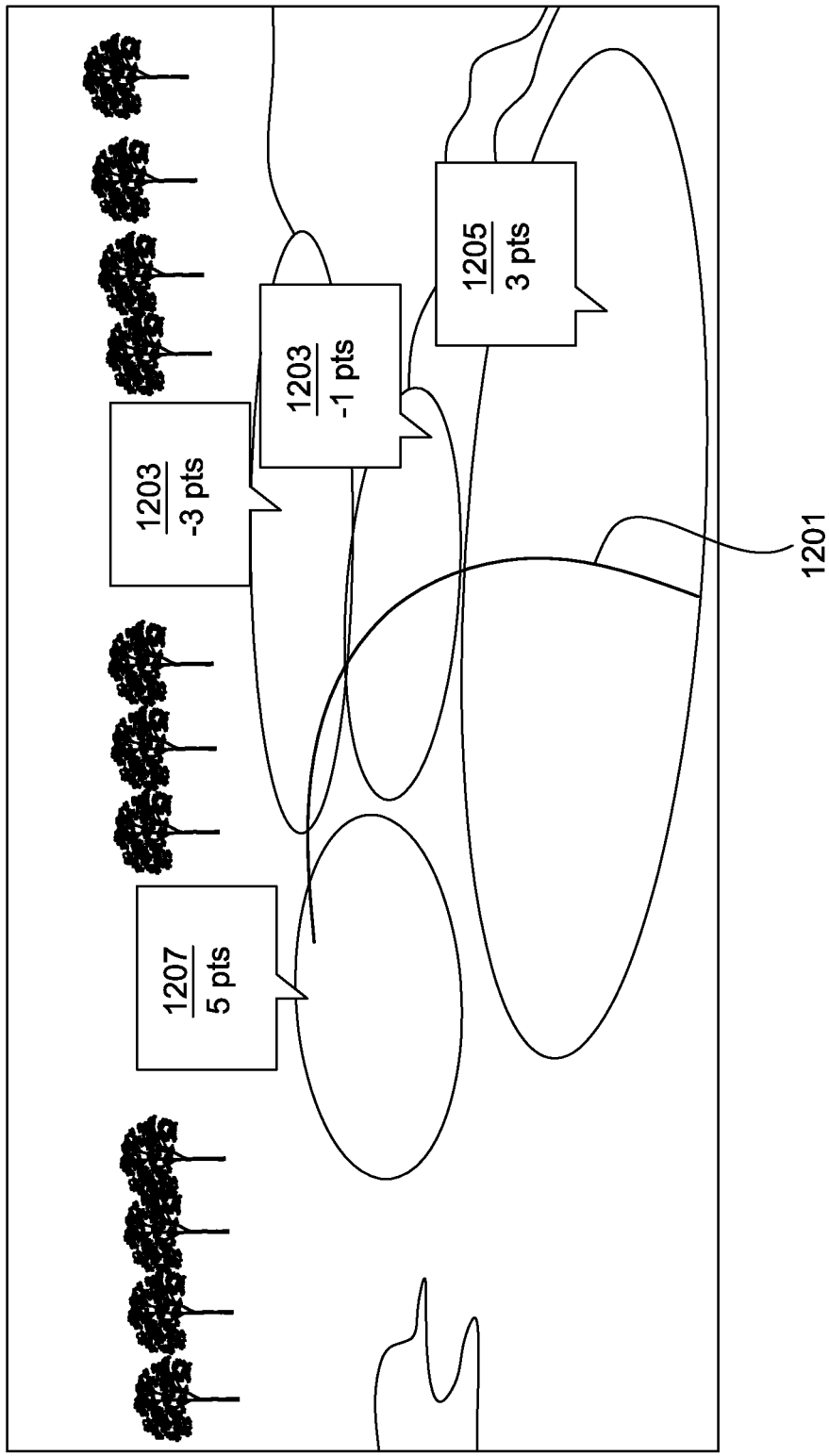
FIG. 12 is a further embodiment of the instant invention, illustrating areas of the golf course landing being assigned point values based on optimal and sub-optimal landing positions.

FIG. 12 is an embodiment of the means of scoring in accordance with the present invention. Within the present invention, the landing of the ball scores points for the user. The higher the score, the closer the user's ball is landing at the "best" ball landing area. For example, the "best" ball is at 1207, the mid-level landing is at 1205, and the lowest level landing is 1203.

FIG. 13 is an overall scorecard 1300 following a round of golf. The round of golf according to the present invention may be either 9 or 18 holes. As shown in the scorecard 1300, there may be multiple users 1301 who play the simulated round. The simulated round also includes the selected user 1303. The score is based on the summed landing areas (i.e. number of shots taken) of the user's ball over a particular hole. This method of scoring is known as stroke play.

The scorecard 1300 also calculates and displays cumulative score of the user and professional as each hole is completed.

The scorecard 1300 also calculates a point winner for each individual hole based on the lowest summed landing areas (i.e., number of shots taken). This method of scoring is known as match play. The user may compete against the professional in both stroke play and match play concurrently.

What is claimed is:

1. A golf simulator software to allow an amateur user to play all or part of a simulated golf game, comprising:
    at least one video clip of a professional golfer shown hitting at least one golf shot on at least one golf hole, on a golf course, whereby at least one golf swing data of each shot is being taken by a launch monitor;
    at least one video clip of said professional golfer discussing strategy for how said golf shot was attempted to be played;
    said at least one golf swing data converted to a professional golfer's golf ball path that is displayed against a backdrop of a virtual golf hole replicating a physical golf hole said golf shot was taken on; and
    the amateur user's golf swing data, taken by a launch monitor and converted to a golf ball path displayed against the backdrop of said virtual golf hole;
    wherein said simulator software is configured to allow said amateur user to play a simulated game of golf in tandem with said professional golfer and compare results to that of said professional golfer.

2. The golf simulator software of claim 1 where video clips are played of the professional golfer giving commentary directed at the amateur user based on actual results of a particular golf shot by the amateur user.

3. The golf simulator software of claim 1, where said professional golfer is hitting at least one golf shot on a physical golf course.

4. The golf simulator software of claim 1, where said professional golfer is hitting at least one golf shot on a simulated golf course.

5. The golf simulator software of claim 1, where said professional golf ball path and said amateur user's golf ball path are displayed at the same time in an overlay fashion.

6. The golf simulator software of claim 5, where said golf ball paths are shown as animations of balls moving from the location where the balls were hit to at least one locations where the balls landed.

7. The golf simulator software of claim 1, where the golf game is scored using stroke play rules, where total number of shots taken by the professional golfer is compared to number of shots taken by the amateur user.

8. The golf simulator software of claim 1, where the software provides a means for the professional golfer and the amateur user to play the game as members of a same team where select shots from each of the players combine to form a team score for a given hole.

9. The golf simulator software of claim 8 where the amateur user, after hitting their first shot on a given hole, chooses to hit their second shot from the same spot where the professional golfers first shot landed or else hit from where their own first shot landed.

10. The golf simulator software of claim 1, where the golf game is match play where points are gained based on which golfer, the professional or the software user, took the least number of shots on a given golf hole.

11. The golf simulator software of claim 1, where the professional golfer's score is displayed alongside the amateur user's score attained on the simulated golf course.

12. The golf simulator software of claim 11, where the professional golfer's score was attained on a physical golf course.

13. The golf simulator software of claim 12, where the professional golfer's score was attained on a virtual golf course.

14. The golf simulator software of claim 1, where the professional golf swing data for a particular swing is displayed alongside the software user's golf swing data for a particular swing where golf swing data includes club head speed, club head angle of attack, golf ball speed, golf ball trajectory, smash factor, golf ball spin rate, golf ball carry distance and golf ball total distance.

15. The golf simulator software of claim 1, where upon completion of a round, the professional golfer's stats are displayed alongside the software user's stats where stats can include drive distances, fairways hit, greens hit in regulation, average number of putts and total distance of putts made.

16. The golf simulator of claim 2, where audio clips only are played when video clips are unavailable.

17. The golf simulator software of claim 1, where both the professional golfer and amateur user compete against each other in a game where results are based on earning points where point values depend on where golf shots land relative to guidance the professional golfer provided prior to the shot.

18. The golf simulator software of claim 1, where instead of collecting golf swing data during a round of golf, golf swing data is generated after a professional golfer's round of golf using known information about ball flight, shot distance, golf club used, and feedback from the professional golfer.

19. The golf simulator software of claim 1, where instead of collecting golf swing data during a round of golf, golf swing data is generated after a professional golfer's round of golf using known information about ball flight, shot distance, golf club used, and feedback from an analyst.

* * * * *